Nov. 14, 1967  R. BOISSONNAS ETAL  3,352,844
NLEU$^4$-LYS$^{17}$-LYS$^{18}$-$\alpha^{1-25}$-ACTH-VAL$^{25}$-AMIDE Filed Jan. 25, 1965  5 Sheets-Sheet 1

INVENTORS
ROGER BOISSONNAS
STEPHAN GUTTMANN
JANOS PLESS
ATTORNEY

R = CTB OR CAT
R' = CTB OR CAT OR Tri

H—Val—Gly—Lys—Lys—Lys—Pro—Val—Lys—Val—Tyr—Pro—Val—NH₂
    R    R    R    R              R
Val—Gly—Lys—Lys—Lys—Pro—Val—Lys—Val—Tyr—Pro—Val—NH₂
    R    R    R    R              R
Val—Gly—Lys—Lys—Lys—Pro—Val—Lys—Val—Tyr—Pro—Val—NH₂
    R    R    R    R              R
Val—Gly—Lys—Lys—Lys—Pro—Val—Lys—Val—Tyr—Pro—Val—NH₂
    R    R    R    R              R
Val—Gly—Lys—Lys—Lys—Pro—Val—Lys—Val—Tyr—Pro—Val—NH₂

United States Patent Office 3,352,844
Patented Nov. 14, 1967

3,352,844
NLEU⁴-LYS¹⁷-LYS¹⁸-α¹⁻²⁵-ACTH-VAL²⁵-AMIDE
Roger Boissonnas, Bottmingen, Stephan Guttmann, Allschwil, and Janos Pless, Basel, Switzerland, assignors to Sandoz Ltd. (also known as Sandoz A.G.), Basel Switzerland
Filed Jan. 25, 1965, Ser. No. 427,599
Claims priority, application Switzerland, Jan. 31, 1964, 1,111/64
1 Claim. (Cl. 260—112.5)

ABSTRACT OF THE DISCLOSURE

A new pentacosapeptide or acid salt thereof is provided as a synthetic substitute for ACTH and having at least as good therapeutic properties as ACTH without its disadvantages. The new polypeptide is particularly characterized by lysine groups in the 17- and 18-positions instead of the arginine groups of natural ACTH.

Figure 1:
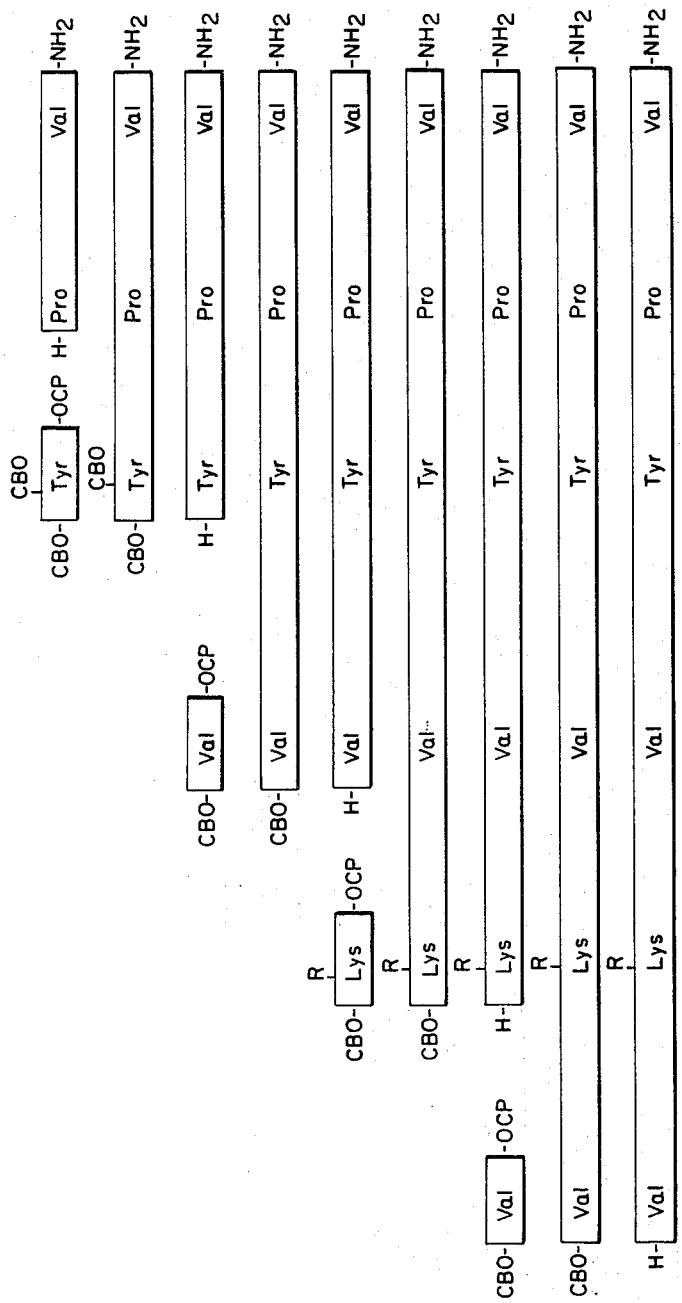

The present invention relates to the novel pentacosapeptide of formula L-seryl-L-tyrosyl-L-seryl-L-norleucyl-L - glutamyl - L - histidyl -L - phenylalanyl - L - arginyl-L - tryptophanyl - glycyl - L - lysyl - L - prolyl - L - valyl-glycyl - L - lysyl - L - lysyl - L - lysyl - L - lysyl - L -prolyl-L - valyl - L - lysyl - L - valyl - L - tyrosyl - L - prolyl - L-valinamide, and its acid addition salts.

This polypeptide can be obtained by methods generally known for the synthesis of such compounds, the amino acids being linked together in the sequence of the above formula one by one or after having first being combined into smaller peptide units.

According to the invention the hitherto unknown pentacosapeptide of formula L-seryl-L-tyrosyl-L-seryl-L-norleucyl - L - glutamyl - L - histidyl - L - phenylalanyl - L-arginyl - L - tryptophanyl - glycyl - L - lysyl - L - prolyl - L-valyl - glycyl - L - lysyl - L - lysyl - L - lysyl - L - lysyl - L-prolyl - L - valyl - L - lysyl - L - valyl - L - tyrosyl - L-prolyl-L-valinamide can be prepared for instance by condensing L-valyl-ε-N-R-L-lysyl-L-valyl-L-tyrosyl-L-prolyl-L-valinamide, wherein R is a carbo-tert.butoxy or a carbo-tert.amyloxy group, with the N-carbobenzoxy-L-valyl - glycyl - ε - N - R - L - lysyl - ε - N - R - L - lysyl-ε - N - R - L - lysyl - ε - N - R - L - lysyl - L - proline-2,4,5-trichlorophenyl ester, wherein R has the above stated meaning, by condensing the resultant N-carbobenzoxy-L-valyl - glycyl - ε - N - R - L - lysyl - ε - N - R - L - lysyl-ε - N - R - L - lysyl - ε - N - R - L - lysyl - L - prolyl - L-valyl - ε - N - R - L - lysyl - L - valyl - L - tyrosyl - L-prolyl-L-valinamide, wherein R has the above stated meaning, after removal of the carbobenzoxy group, with the N - triphenyl - methyl - γ - O - tert. - butyl - L - glutamyl-im - triphenylmethyl - L - histidyl - L - phenylalanyl - L-arginyl - L - tryptophanyl - glycyl - ε - N - R - L - lysyl - L-proline-2,4,5-trichlorophenyl ester, wherein R has the above stated meaning, by condensing the resultant N-triphenylmethyl - γ - O - tert. - butyl - L - glutamyl - im-triphenylmethyl - L - histidyl - L - phenylalanyl - L -arginyl - L - tryptophanyl - glycyl - ε - N - R - L - lysyl-L - prolyl - L - valyl - glycyl - ε - N - R - L - lysyl - ε - N-R - L - lysyl - ε - N - R - L - lysyl - ε - N - R - L - lysyl-L - prolyl - L - valyl - ε - N - R - L - lysyl - L - valyl - L-tyrosyl-L-prolyl-L-valinamide, wherein it again has the above stated meaning, after removal of the triphenyl-methyl group, with the N-R'-L-seryl-L-tyrosyl-L-seryl-L-norleucyl azide, wherein R' is a triphenylmethyl, a carbo-tert.butoxy or a carbo-tert.-amyloxy group, and by then removing all the protective groups in one or more stages in an acid medium from the resultant novel protected pentacosapeptide N - R' - L-seryl-L-tyrosyl-L-seryl-L-norleucyl - γ - O - tert. - butyl - L - glutamyl - L - im - triphenyl - methyl - histidyl - L - phenylalanyl - L - arginyl-L - tryptophanyl - glycyl - ε - N - R - L - lysyl - L - prolyl-L - valyl - glycyl - ε - N - R - L - lysyl - ε - N - R - L - lysyl-ε - N - R - L - lysyl - ε - N - R - L - lysyl - L - prolyl - L-valyl - ε - N - R - L - lysyl - L - valyl - L - tyrosyl - L-prolyl-L-valinamide, wherein R and R' have the stated meanings.

The initial products used for the synthesis of the hitherto unknown pentacosapeptide derivative of the above stated formula, to the extent they have not yet been described, are obtainable by methods conventional in peptide chemistry, namely by linking together the amino acids one by one or by linking together smaller peptide sequences that have been previously prepared.

The novel pentacosapeptide obtained by the present method can also be prepared and used in the form of its salts. These may be salts with organic acids, such as acetic acid, propionic acid, glycolic acid, lactic acid, pyruvic acid, malonic acid, succinic acid, maleic acid, fumaric acid, tartaric acid, citric acid, benzoic acid, cinnamic acid, salicylic acid, 2-phenoxybenzoic acid or 2-acetoxybenzoic acid, mandelic acid, methanesulphonic acid, ethanesulfonic acid, hydroxyethanesulfonic acid, benzenesulfonic acid or toluenesulfonic acid, naphthalenesulfonic acid, sulfanilic acid, as well as polymeric acids, such as tannic acid, alginic acid, polygalacturonic acid, or carboxymethyl-cellulose, as well as salts with inorganic acids including hydrohalic acids, such as hydrochloric acid or hydrobromic acid, nitric acid, thiocyanic acid, sulfuric acid and phosphoric acid.

The pentacosapeptide and its salts according to the invention have similar biological and therapeutic properties to natural corticotropin (ACTH).

It can be used for treatment of the following diseases:

acute and chronic articular rheumatism, colitis ulcerosa;
nephrosis;
collagenoses, such as lupus erythematodes, sclerodermia and so forth;
allergic diseases of different organs, such as asthma bronchiale, eczema, urticaria; dermatitis exfoliativa, anaphylactic shock, etc.;
hypophysial insufficiencies.

A major advantage of the synthetic pentacosapeptide over natural hormones extracted from animal material is that the former has no antigenic effects. There is therefore no objection to its use in the case of the above mentioned diseases even if the patient in the course of an earlier treatment proved to be allergic to natural ACTH.

According to the usual and accepted standard tests the activity of the novel pentacosapeptide is high compared with natural corticotropin.

Whereas the purification of natural corticotropin involves arduous and expensive techniques and the purified product always still contains high molecular protein-like impurities which may give rise to dangerous anaphylactic reactions, the novel synthetic compound is directly obtainable in a high state of purity entirely lacking contamination by substances of protein character. Moreover, the preparation of the novel synthetic compound is independent of the availability of hypophysial glands which are both scarce and expensive. It is a special advantage that the novel compound does not contain a methionine group in 4 position as does the natural ACTH. As known, the methionine group is readily oxidizable and may easily cause the hormone to change into an inactive form. In its place the synthetic compound contains a norleucine group which has the same steric properties as the methionine group, but which is stable to oxidation. Moreover, in positions 17 and 18 the novel compound has two lysine groups instead of the arginine groups present in these positions in the natural ACTH. This substantially simplifies the synthesis of the novel pentacosapeptide, but surprisingly the biological activity of the novel compound is not thereby impaired. Moreover, in position 25 the novel compound has a valinamide group which is absent in this position in the natural ACTH. This valinamide group at the carboxyl end protects the peptide chain from enzymatic degradation, a fact which is useful in subcutaneous or intramuscular administration. The novel compound can also be administered in the same way as natural ACTH in the form of a depot preparation.

The novel pentacosapeptide can be used as a medicament, for example in the form of a pharmaceutical preparation. For parenteral application this may contain the said compound in mixture with a suitable organic or inorganic medium. Appropriate media that do not react with the novel compound include gelatine, lactose, starch, magnesium stearate, talc, vegetable oils, benzyl alcohols, gum arabic, polyalkylene glycols, Vaseline, cholesterol, or other familiar medication media. The pharmaceutical preparation may be liquid, for instance in the form of solutions, suspensions or emulsions. They may be sterilized and/or they may contain supplementary substances, such as preservatives, stabilizers, wetting or emulsifying agents. Moreover, they may also contain other therapeutically valuable substances.

The pentacosapeptide and its salts prepared according to the present invention may further be used as an intermediate in the production of other pharmaceutical preparations. For its synthesis the 2,4,5-trichlorophenyl ester of carbobenzoxyamino acids was preferentially and carbobenzoxy peptides were occasionally used.

During the synthesis of the novel pentacosapeptide the triphenylmethyl, the carbo-tert.butoxy and the carbo-tert.amyloxy groups proved useful protecting the amino group of the serine residue, but other suitable protective groups, such as the carbobenzoxy the trifluoroacetyl, the acetyl, the chloroacetyl or the formyl groups are likewise applicable.

For protecting the ε-amino group of the lysine residue the carbotert.butoxy and the carbotert.amyloxy groups have been found to be effective, but other suitable protective groups, such as the carbobenzoxy, the toluenesulfonyl, the phthalyl, the formyl and trifluoroacetyl groups, can also be successfully used.

For protecting the γ-carboxyl group of the glutamine residue the tert.-butyloxy group proved appropriate, although other suitable protective groups, such as the methoxy, the ethoxy, the tert.-amyloxy, the amide or benzyloxy groups are also effective.

For protecting the imidazole group of the histidine residue the triphenylmethyl group has been found appropriate, although here again other protective groups, such as the carbotert.-butoxy, the carbotert.-amyloxy, the carbobenzoxy or the benzyl group can also be used.

The following abbreviations will be hereinafter used:

CBO=Carbobenzoxy
Tri=Trityl=triphenylmethyl
CTB=Carbo-tert.-butyloxy
CAT=Carbo-tert.-amyloxy
OCP=2,4,5-trichlorophenoxy
OTB=tert.-butyloxy
OMe=Methoxy
OEt=Ethoxy
Arg=L-arginyl
Glu=L-glutamyl
Gly=Glycyl
His=L-histidyl
Lys=L-lysyl
Nle=L-norleucyl
Phe=L-phenylalanyl
Pro=L-prolyl
Ser=L-seryl
Try=L-tryptophanyl
Tyr=L-tyrosyl
Val=L-valyl In the following non-limitative examples all temperatures are given in degrees centigrade.

EXAMPLE 1

*The preparation of α-N-carbobenzoxy-ε - N - carbo-tert.-butoxy-L-lysine - 2,4,5 - trichlorophenyl ester. (CBO-(CTB)Lys-OCP) (FIG. 1)*

104 g. of α-N-carbobenzoxy-ε - N-carbo-tert.butoxy-L-lysine and 70 g. of 2,4,5-trichlorophenol are dissolved in 900 ml. of chloroform and 90 ml. of acetonitrile, and at −10° 56 g. of dicyclohexyl-carbodiimide are added. The mixture is shaken for two hours and the urea removed by filtration. After evaporation of the solvent the residue is dissolved in ethanol and precipitated with petroleum ether. Recrystallization from ethanol and water yields 140 g. of α-N-carbobenzoxy-ε - N - carbo-tert.-butoxy-L-lysine-2,4,5-trichlorophenyl ester. M.P. 99°.

$$[\alpha]_D^{22°} = -11°$$

in dimethylformamide.

EXAMPLE 2

*The preparation of L-valyl-ε - N - carbo-tert.-butoxy-L-lysyl-L-valyl-L-tyrosyl - L - prolyl-L-valinamide. (H-val-(CTB)Lys-Val-Tyr-Pro-Val-NH$_2$) (FIG. 1)*

50 g. of L-prolyl-L-valinamide (H-Pro-Val-NH$_2$) and 100 g. of CBO-(CBO)Tyr-OCP are dissolved in 100 ml. of dimethylformamide and allowed to stand for 48 hours at 20° before being filtered. 500 ml. of a N hydrochloric acid are added to the solution and the oily residue is dissolved in ethyl acetate. The solution is first washed with dilute hydrochloric acid and a solution of sodium bicarbonate, and the solvent is then evaporated. After recrystallization of the dry residue from a mixture of ethyl acetate and diethyl ether 100 g. of CBO-(CBO)Tyr-Pro-Val-NH$_2$ (M.P. 133°) are obtained. 90 ml. of a 2 N solution of sodium hydroxide and 200 ml. of ethanol are added. The mixture is allowed to stand at room temperature for one hour at the end of which 1000 ml. of a N hydrochloric acid are added. The residue is washed first with water and, after having been dried, with ethyl acetate. 60 g. of CBO-Tyr-Pro-Val-NH$_2$, M.P. 220°, $$[\alpha]_D^{21} = -23°$$

in dimethylformamide, are obtained. The product is dissolved in 200 ml. of a 4 N solution of hydrogen bromide in glacial acetic acid and allowed to stand at 20° for one hour. After addition of a mixture of diethyl ether and ethyl acetate the H-Tyr-Pro-Val-NH$_2$ precipitates in the form of the hydrobromide, M.P. 220°. 42 g. of H-Tyr-Pro-Cal-NH$_2$.HBr$_2$ are dissolved in 200 ml. of dimethylformamide, 36 g. of N-carbobenzoxy-L-valine-2,4,5-trichlorophenyl ester (CBO-Val-OCP) and 12 ml. of triethylamine being added. The mixture is shaken for 48 hours at room temperature at the end of which 500 ml. of a N hydrochloric acid are added. The precipitated product is dissolved in ethyl acetate and washed with dilute hydrochloric acid and a solution of sodium bicarbonate. The ethyl acetate solution is precipitated with ether. 39 g. of CBO-Val-Tyr-Pro-Val-NH$_2$, M.P. 127°, $[\alpha]_D^{21} = -26°$ in dimethylformamide, are obtained.

The product is dissolved in 200 ml. of a 4 N solution of hydrogen bromide in glacial acetic acid and allowed to stand at 20° for one hour. Upon addition of a mixture of diethyl ether and ethyl acetate 32 g. of H - Val - Tyr - Pro - Val - NH$_2$.HBr are precipitated.

29 g. of this H - Val - Tyr - Pro - Val - NH$_2$.HBr and 33 g. of CBO - (CTB)Lys - OCP (Example 1) are dissolved in 100 ml. of dimethyl formamide 7.5 ml. of triethylamine being added to the solution. This is shaken at 20° for 48 hours, at the end of which 500 ml. of a N acetic acid are added. The precipitated product is washed with water and then with ethyl acetate. 35 g. of CBO - (CTB)Lys - Val - Tyr - Pro - Val - $NH_2$, M.P. 125° (decomp.), $[\alpha]_D^{21}=-25°$ in dimethylformamide, are obtained.

39 g. of CBO - (CTB) Lys - Val - Tyr - Pro - Val-$NH_2$ are dissolved in 500 ml. of methanol and hydrogenated at normal pressure in the presence of a palladium catalyst. After filtration and evaporation of the solvent in vacuo the residue is treated with ether. 28 g. are thus obtained of H - (CTB)Lys - Val - Tyr - Pro-Val - $NH_2$. M.P. 145° (decomp.), $[\alpha]_D^{21}=-30°$ in dimethyl formamide.

33 g. of H - (CTB)Lys - Val - Tyr - Pro - Val - $NH_2$ and 23 g. of CBO - Val - OCP are dissolved in 150 ml. of dimethylformamide and allowed to stand at 20° for 48 hours. The solution is evaporated in vacuo and the residue dissolved in a little n-butanol and ethyl acetate. After having been washed with dilute sulfuric acid and a solution of sodium bicarbonate the solution is evaporated to the dry residue. Treatment with diethyl ether yields 33 g. of N - CBO - Val - (CTB)Lys - Val - Tyr-Pro - Val - $NH_2$. M.P. 171°, $[\alpha]_D^{21}=-27°$ in dimethylformamide. The product thus obtained is dissolved in 500 ml. of methanol and hydrogenated at normal pressure in the presence of a palladium catalyst. After filtration, evaporation in vacuo and drying at 40°, 22 g. of H - Val - (CTB)Lys - Val - Tyr - Pro - Val - $NH_2$ are obtained. $[\alpha]_D^{21}=-26°$ in dimethylformamide.

*Example 3*

Figure 2:
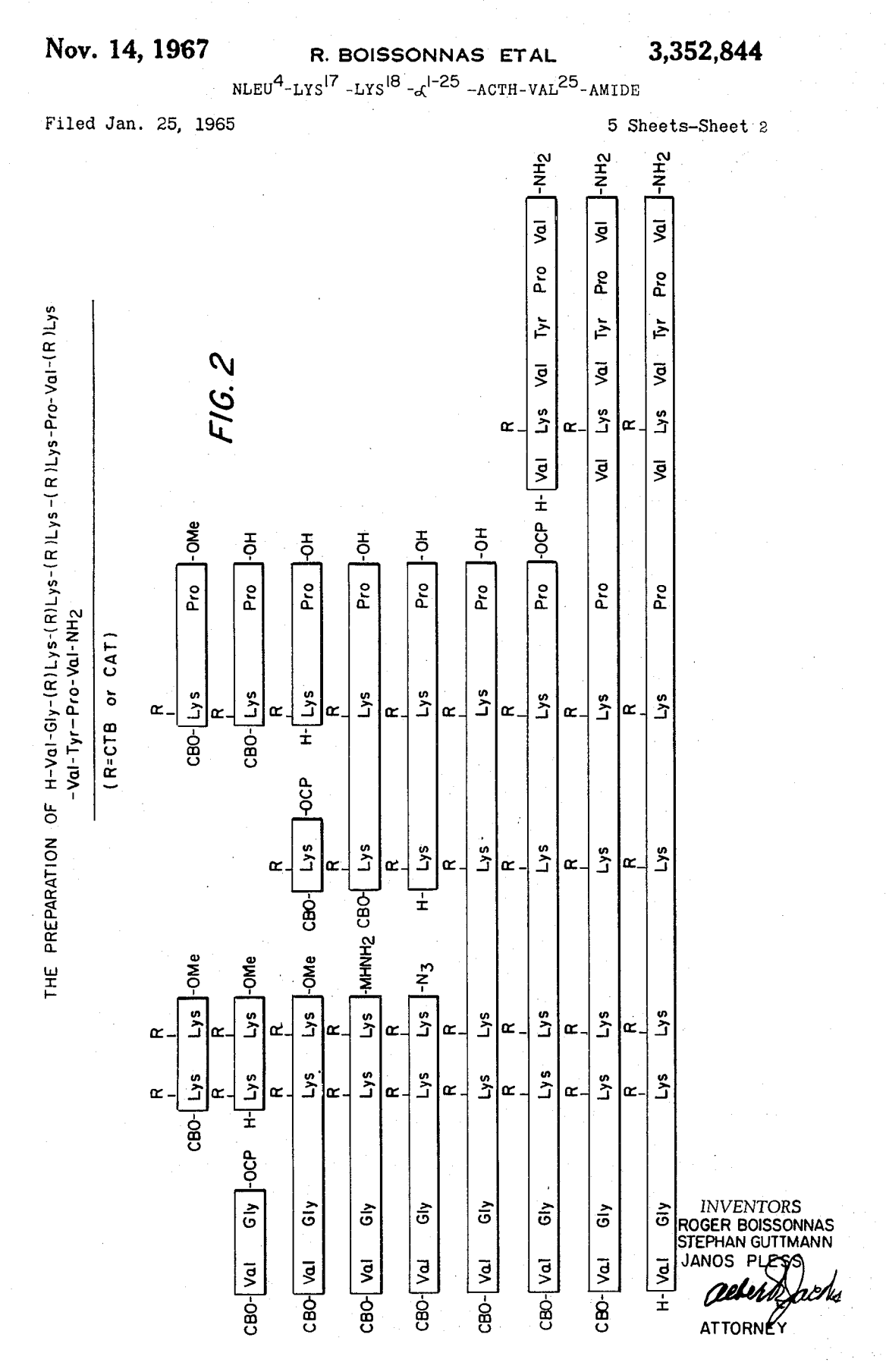

L - valyl - glycyl - ε - N - carbo - tert.butoxy - L - lysyl-ε - N - carbo - tert. - butoxy - L - lysyl - ε - N - carbo-tert.butoxy - L - lysyl - ε - N - carbo - tert. - butoxy-L - lysyl - L - prolyl - L - valyl - ε - N - carbo - tert.-butoxy - L - lysyl - L - valyl - L - tyrosyl - L - prolyl-L - valinamide - H - Val - Gly - (CTB)Lys - (CTB)-Lys - (CTB)Lys - (CTB)Lys - Pro - Val - (CTB)Lys-Val - Tyr - Pro - Val - $NH_2$ *(Fig. 2)*

470 g. of CBO - (CTB)Lys - OH and 182 ml. of triethylamine are dissolved in 5 litres of ethyl acetate; 125 ml. of ethyl chloroformate are added dropwise at −5°; the mixture is stirred at −5° for 30 minutes; 190 g. of H - Pro - OMe are added and, after this has been allowed to stand at 20° for 4 hours, it is washed with dilute sulfuric acid and ammonia, dried and evaporated. 550 g. of an oily dipeptide are obtained which is dissolved in 3 litres of dioxane, cooled to 0° and, after the further addition of 3 litres of a N sodium hydroxide solution, shaken for one hour at 20° and concentrated to 3 litres, 3 litres of water being then added. After washing with diethyl ether, cooling to 0°, acidification with a 10% phosphoric acid to pH2, extraction of the separated oil with ethyl acetate, drying and evaporating, the residue is washed with petroleum ether and dried. 470 g. of CBO - (CTB) Lys - Pro - OH ($[\alpha]_D^{20}=-43°$ in dimethylformamide) are obtained and dissolved in 3 litres of methanol and 300 ml. of water for hydrogenation in the presence of 30 g. of a 10% palladium carbon. After filtration and evaporation the residue is washed with diethyl ether. 323 g. of H - (CTB)Lys - Pro - OH are obtained, M.P. 114°; $[\alpha]_D^{20}=-52°$ in dimethylformamide.

The dipeptide above obtained is dissolved in 1000 ml. of dimethylformamide; 480 g. of CBO - (CTB)Lys-OCP are added; the mixture is allowed to stand for 12 hours at 20°, then evaporated, the residue being dissolved in 1000 ml. of sodium bicarbonate, washed with diethyl ether and the aqueous phase acidified with a 10% solution of citric acid, followed by extraction with ethyl acetate, drying, evaporation and treatment of the residue with petroleum ether. 308 g. of CBO - (CTB)Lys-(CTB)Lys - Pro - OH (M.P. 125°) are thus obtained and dissolved in 3 litres of methanol and 300 ml. of water. This is hydrogenated in the presence of 45 g. of palladium carbon, filtered, evaporated and the residue crystallized from a mixture of dioxane and diethyl ether. 205 g. of H - (CTB)Lys - (CTB)Lys - Pro - OH, M.P. 160°, $[\alpha]_D^{20}=-24°$ in dimethylformamide, are obtained. 380 g. of CBO - (CTB)Lys - OH and 260 g. of H - (CTB)Lys - OMe are dissolved in a mixture of 1500 ml. of acetonitrile and 300 ml. of dimethylformamide, cooled to −20° and, after addition of 206 g. of dicyclohexylcarbodiimide, shaken at −5° for 12 hours, followed by filtration, evaporation, solution of the residue in ethyl acetate, washing with a dilute solution of sulfuric acid and ammonia, drying, evaporation and crystallization of the residue from a mixture of diethyl ether and petroleum ether. 410 g. of CBO - (CTB)Lys - OMe are obtained, M.P. 105°; $[\alpha]_D^{20}=-10°$ in methanol.

The dipeptide ester above obtained is dissolved in 3 litres of methanol, hydrogenated in the presence of 50 g. of palladium catalyst and the solvent is evaporated after filtration. The residue is dissolved in 1000 ml. of dimethylformamide, 310 g. of CBO-Val-Gly-OCP are added, the mixture is allowed to stand at 20° for 12 hours, evaporated, treated with ethyl ether, crystallized from methanol and water (1:1) and dried. 448 g. of CBO-Val-Gly-(CTB)Lys - (CTB)Lys - OMe. M.P. 191°; $[\alpha]_D^{20}=-16°$ in methanol. The tetrapeptide ester thus obtained is dissolved in 600 ml. of methanol, 200 ml. of hydrated hydrazine are added, the mixture being allowed to stand at 20° for 16 hours, at the end of which 2 litres of water are added and, after filtration, washing with water, drying over sulfuric acid, and dissolving in methanol, the solution is pured into ether, filtered and dried. 366 g. of CBO-Val-Gly-(CTB)Lys-(CTB)Lys-$NHNH_2$ are obtained. M.P. 204–206°; $[\alpha]_D^{20}=-11°$ in dimethylformamide.

48.2 g. of CBO-Val-Gly-(CTB)Lys-(CTB)Lys-$NHNH_2$ are dissolved in a mixture, cooled to −10°, of 400 ml. of dimethylformamide, 100 ml. of isopropanol and 60 ml. of a 4 N hydrochloric acid. With vigorous stirring 14 ml. of a 5 N solution of sodium nitrite are added and, after continuing to stir at −5° for another 5 minutes, first 35 ml. of triethylamine and then 1000 ml. of ice water are added. After sharp filtration on a suction filter, the precipitate is dissolved in 200 ml. of dimethylformamide; 28.5 g. of H-(CTB)Lys-(CTB)Lys-Pro-OH and 7 ml. of triethylamine are added. In a high vacuum the volume is concentrated to 180 ml. and, after this has been allowed to stand at 0° for 16 hours, 1500 ml. of ethyl acetate are added, followed by washing with dilute acetic acid and evaporation of the ethyl acetate, the residue being poured into 2 litres of water, filtered and dried over sodium hydroxide. 42 g. of CBO-Val-Gly-(CTB)Lys-(CTB)Lys-(CTB)Lys-(CTB)Lys-Pro-OH are obtained. M.P. 156° (decomp.); $[\alpha]_D^{20}=-5°$ in dimethylformamide.

The heptapeptide thus obtained is dissolved in 160 ml. of pyridine, evaporated and the residue dissolved in 160 ml. of absolute pyridine. 22 g. of tri-(2,4,5-trichlorophenyl)-phosphite are added; the mixture is stirred at 20° for 16 hours, the solvent evaporated and the precipitate dissolved in ethyl acetate, washed with dilute sulfuric acid and again in a N solution of sodium bicarbonate. After drying over sodium sulfate, evaporation of the solvent and crystallisation of the residue from a mixture of ethyl ester and petroleum ether 44 g. of CBO-Val-Gly-(CTB)Lys - (CTB)Lys - (CTB)Lys-(CTB)Lys-Pro-OCP are obtained and at once dissolved in 150 ml. of dimethylformamide. 38 g. of H-Val-(CTB)Lys-Val-Tyr-Pro-Val-$NH_2$ are added and, after having allowed the solution to stand at 20° for 2 days it is precipitated with diethyl ether. After filtration and drying the product is dissolved in a mixture of methanol and water (8:2), treated with an acid ion exchanger, the solvent is driven off and the residue crystallized from ethanol and water (8:2). 45.5 g. of CBO-Val - Gly - (CTB)Lys - (CTB)Lys - (CTB)Lys-(CTB)Lys-Pro-Val-(CTB)Lys-Val-Tyr-Pro-Val-$NH_2$ are thus obtained. M.P. 198° (decomp.); $[\alpha]_D^{20}=+5$ in dimethylformamide. This tridecapeptide is dissolved in 500 ml. of methanol, hydrogenated in the presence of 5 g. of palladium carbon, filtered, the solvent evaporated and the residue treated with diethyl ether. The yield is 26.3 g. of H - Val - Gly - (CTB)Lys - (CTB)Lys - (CTB)Lys-(CTB)Lys-Pro - Val - (CTB)Lys-Val-Tyr-Pro-Val-NH$_2$. M.P. 198°.

EXAMPLE 4

Figure 3:
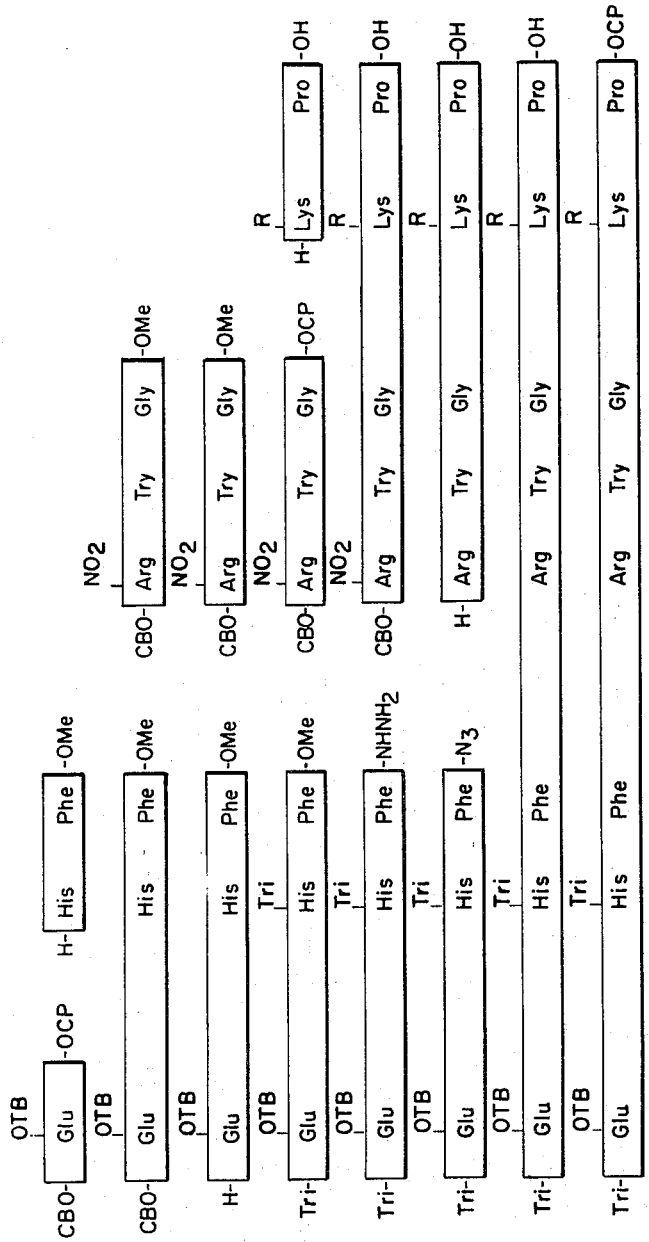

*Trityl-O-tert.butyl-L-glutamyl - imtrityl - L - histidyl - L-phenylalanyl - L - arginyl - L - tryptophanyl-glycyl-ε-N-carbo - tert. - butoxy - L-lysyl-L-proline-2,4,5-trichlorophenyl ester. Tri-Glu(OTB)-(Tri)His - Phe - Arg-Try-Gly-(CTB)Lys-Pro-OCP (FIG. 3)*

300 g. of CBO-(NO$_2$)Arg-Try-Gly-OMe are dissolved in 5 litres of a dioxane and water mixture (8:2); 720 ml. of a N solution of sodium hydroxide are added; the mixture is allowed to stand at 20° for one hour; 16 litres of an 0.05 N sulfuric acid are poured in; the precipitate is suction filtered, washed with water, alcohol, diethyl ether and petroleum ether and then dried. 285 g. of CBO-(NO$_2$)Arg - Try - Gly - OH are obtained (M.P. 225°, $[\alpha]_D^{20}=-14°$ in dimethylformamide), which are dissolved in 3.5 litres of absolute pyridine. 250 g. of tri-(2,4,5-trichlorophenyl)-phosphite are added; the mixture is stirred at 20° for 16 hours, the solvent evaporated, the residue dissolved in ethyl acetate, washed with dilute sulfuric acid, dried and the solvent again evaporated. The residue is crystallized from a mixture of ethyl acetate and diethyl ether, yielding 370 g. of CBO-(NO$_2$)Arg-Try-Gly-OCP. M.P. 124°; $[\alpha]_D^{20}=-9°$ in dimethylformamide. The tripeptide ester thus obtained is dissolved in 700 ml. of dimethylformamide, 220 g. of H-(CTB)Lys-Pro-OH (Example 3) are added; the mixture is stirred at 20° for 16 hours, precipitated with diethyl ether and filtered. The precipitate is dissolved in a mixture of ethyl ester and water, washed with a N citric acid and, after having been dried, the solvent is evaporated. The residue is crystallized twice from ethyl acetate. 370 g. of CBO-(NO$_2$)Arg - Try - Gly - (CTB)Lys - Pro - OH. M.P. 142°; $[\alpha]_D^{20}=-20°$ in dimethylformamide.

245 g. of CBO-(NO$_2$)Arg-Try-Gly-(CTB)Lys-Pro-OH are dissolved in 450 ml. of glacial acetic acid and 50 ml. of water as well as 50 g. of palladium/carbon, 10%, are added. This is followed by hydrogenation, filtration, evaporation, redissolution in water, lyophilization and drying over sodium hydroxide. 135 g. of H-Arg-Try-Gly-(CTB)Lys-Pro-OH are obtained, $[\alpha]_D^{20}=-9°$ in acetic acid and water (95:5). 457 g. of H-His-Phe-OMe.2 HBr and 266 ml. of triethylamine are dissolved in 1000 ml. of dimethylformamide, the solution is stirred at 0° for 10 minutes, filtered, 495 g. of CBO-Glu(OTB)-OCP are added to the filtrate which is then allowed to stand at 20° for 16 hours. The dimethylformamide is evaporated, the residue dissolved in ethyl acetate, washed with acetic acid diluted with water and a N solution of sodium bicarbonate, dried over sodium sulfate and washed with dilute aqueous acetic acid and a N solution of sodium bicarbonate. The solution is dried over sodium sulfate, the solvent evaporated and the residue crystallized from ethyl acetate. 338 g. of CBO-Glu(OTB)-His-Phe-OMe are obtained. M.P. 183°; $[\alpha]_D^{20}=-21°$ in dimethylformamide.

The tripeptide thus prepared is dissolved in 3 litres of methanol, hydrogenated in the presence of 50 g. of palladium/carbon, 10%, and, after filtration and evaporation, the residue is dissolved in 1.5 litres of methylene chloride; the solution is cooled to 0°; 140 ml. of triethylamine are added followed by 270 g. of triphenylchloromethane. The mixture is allowed to stand at 20° for 16 hours, washed with dilute acetic acid, water and a N solution of sodium bicarbonate, then dried and the solvent evaporated. The residue is dissolved in diethyl ether and precipitated with petroleum ether. 283 g. of Tri-Glu(OTB)-(Tri)His-Phe-OMe (M.P. 80°, decomp.) are obtained and dissolved in 1000 ml. of methanol. 50 ml. of hydrazine are added, the mixture is allowed to stand at 20° for 24 hours, the volume being then concentrated to 500 ml. to which 5 litres of diethyl ether are added, followed by washing with an 0.1 N solution of common salt, drying, reconcentration to 500 ml. and precipitation with petroleum ether. 390 g. of Tri-Glu(OTB)-(Tri)His-Phe-NHNH$_2$ are obtained. M.P. 80°, decomp.; $[\alpha]_D^{20}=-14°$ in dimethylformamide.

41.6 g. of Tri-Glu(OTB)-(Tri)His-Phe-NHNH$_2$ are dissolved in 100 ml. of dimethylformamide and 100 ml. of isopropanol, cooled to $-10°$ and 40 ml. of a 4 N hydrochloric acid are added first, followed by 9 ml. of a 5 N solution of sodium nitrite, with stirring. After 5 minutes 28 ml. of triethylamine and 1000 ml. of ice water are added, the mixture is filtered with suction, the precipitate dissolved in ethyl acetate, washed with a saturated solution of common salt, dried and, after evaporation of the solvent at 0°, the residue is dissolved in 100 ml. of dimethylformamide. 26 g. of H-Arg-Try-Gly-(CTB)Lys-Pro-OH.3 AcOH and 4.5 ml. of triethylamine are added, the mixture is allowed to stand at 0° for 16 hours, 1000 ml. of ethyl acetate are added and, after washing with a 0.5 N acetic acid, water and a 0.5 N pyridine, the solvent is driven off, the residue dissolved in 100 ml. of ethyl acetate and the solution precipitated with diethyl ether. 46.4 g. of Tri-Glu(OTB)-(Tri)His-Phe-Arg-Try-Gly-(CTB)Lys-Pro-OH are obtained. M.P. 180°. $[\alpha]_D^{20}=-13°$ in dimethylformamide. The above obtained peptide is dissolved in 200 ml. of pyridine, cooled to $-20°$, 30 ml. of a N solution of hydrochloric acid in dioxane are added, the mixture is stirred at $-20°$ for 5 minutes, 7.8 ml. of triethylamine are added, the volume is concentrated by half, 30 g. of tri-(trichlorophenyl)phosphate are added and the mixture is again allowed to stand at 20° for 16 hours, the solvent being then evaporated, the residue treated with diethyl ether, dissolved in ethyl acetate, precipitated with diethyl ether, filtered and dried. 51.6 g. of Tri-Glu(OTB)-(Tri)His-Phe-Arg-Try-Gly-(CTB)Lys-Pro-OCP.HCl are obtained. M.P. 170° (decomp.) $[\alpha]_D^{20}=-20°$ in dimethylformamide.

EXAMPLE 5

*L - seryl - L - tyrosyl - L - seryl - L - norleucyl - L-glutamyl - L - histidyl - L - phenylalanyl - L - arginyl-L - tryptophanyl - glycyl - L - lysyl - L - prolyl - L-valyl - glycyl - L - lysyl - L - lysyl - L - lysyl - L - lysyl-L - prolyl - L - valyl - L - lysyl - L valyl - L - tyrosyl-L - prolyl - L - valinamide. (H - Ser - Tyr - Ser - Nle-Glu - His - Phe - Arg - Try - Gly - Lys - Pro - Val - Gly-Lys - Lys - Lys - Lys - Pro - Val - Lys - Val - Tyr - Pro-Val-NH$_2$) (FIG. 2)*

174 g. of Tri-Ser-OH and 117 g. of H-Tyr-OMe are dissolved in a mixture of 2 litres of acetonitrile, 1 litre of chloroform and 50 ml. of dimethylformamide and cooled to $-10°$. 124 g. of dicyclohexylcarbodiimide are added and the mixture is stirred at 20° for 5 hours. After filtration, washing with 1.5 litres of pyridine and evaporation of the combined filtrates until dry, the residue is crystallized from hot ethyl acetate. 221 g. of Tri-Ser-Tyr-OMe are obtained, M.P. 232°; $[\alpha]_D^{21}=-34°$ in dimethylformamide. The product thus obtained is dissolved in 500 ml. of dimethylformamide and 100 ml. of hydrazine are added. The solution is allowed to stand at 20° for 24 hours, then poured into 5 litres of water and centrifuged, the oily residue being dissolved in 2 litres of ethyl acetate and the solution washed with water until neutral. It is dried over sodium sulfate, evaporated until dry and residue washed with ether. 182 g. of Tri-Ser-Tyr-NHNH$_2$ result. M.P. 120° (decomp.); $[\alpha]_D^{21}=-30°$ in dimethylformamide.

131 g. of CBO-Ser-OH and 95 g. of H-Nle-OMe hydrochloride are dissolved in 2 litres of chloroform and 70 ml. of triethylamine, cooled to $-10°$, 124 g. of dicyclohexylcarbodiimide are added and the mixture stirred at 20° for 5 hours. After filtration and evaporation the residue is washed with petroleum ether and water and dried. After crystallization from a mixture of ethyl acetate and petroleum ether 151 g. of CBO-Ser-Nle-OMe are obtained. M.P. 71°; $[\alpha]_D^{22} = -19°$ in methanol. The CBO-group is split by catalytic hydrogenation in methanol in the presence of a palladium catalyst and an equivalent quantity of hydrogen chloride. After removal of the catalyst, evaporation and the addition of ethyl ether H-Ser-Nle-OMe hydrochloride is obtained.

46 g. of Tri-Ser-Tyr-NHNH$_2$ are dissolved in a mixture of 120 ml. of dimethylformamide, 120 ml. of isopropanol and 120 ml. of water and cooled to −10°. First, 44 ml. of a 6 N hydrochloric acid are added and 3.5 g. of sodium nitrite are then introduced with vigorous stirring. At the end of 5 minutes 250 ml. of a N potassium carbonate and 1500 ml. of water are also added. After filtration with suction the solid product is dissolved in 200 ml. of dimethylformamide and allowed to stand at 20° for 16 hours after 24 g. of H-Ser-Nle-OMe hydrochloride and 23 ml. of triethylamine have been added.

The solution is poured into 1000 ml. of water, extracted with ethyl acetate, dried over sodium sulfate and evaporated. When the residue has been washed with ether 56.5 g. of Tri-Ser-Tyr-Ser-Nle-OMe remain. M.P. 130–140° (decomp): $[\alpha]_D^{20} = -7°$ in dimethylformamide.

The product thus obtained is dissolved in 200 ml. of hot ethanol and allowed to stand for 24 hours at 20°, 3 ml. of hydrazine having been previously added. At the end of this period 200 ml. of ether are introduced. This is followed by filtration, washing with ether and drying in a vacuum over phosphorus pentoxide and conc. sulfuric acid. 51 g. of Tri-Ser-Tyr-Ser-Nle-NHNH$_2$ are obtained. M.P. 205°. 6.1 g. of Tri-Glu(OTB)-(Tri)His-Phe-Arg-Try-Gly-(CTB)Lys-Pro-OCP.HCl and 5.7 of H-Val-Gly-(CTB)Lys-(CTB)Lys-(CTB)Lys - (CTB)Lys - Pro - Val-(CTB)Lys-Val-Tyr-Pro-Val-NH$_2$ are dissolved in 20 ml. of dimethylformamide and the solution is allowed to stand for 3 days at 20° with an addition of 3.0 g. of imidazole. Another 0.6 g. of the same octapeptide hydrochloride are then added before the mixture is kept standing for another 16 hours at 20°. After precipitation with ethyl acetate, filtration, dissolution of the precipitate in ethanol, precipitation with ethyl acetate, filtration and drying, 8.0 g. of Tri-Glu(OTB)-(Tri)His-Phe-Arg-Try-Gly-(CTB)Lys - Pro - Val-(CTB)Lys-(CTB)Lys-(CTB)Lys-(CTB)Lys - Pro - Val - (CTB)Lys-Val-Tyr-Pro-Val-NH$_2$ are obtained (M.P. 195° with decomp.;

$$[\alpha]_D^{20} = -27°$$

in dimethylformamide), which are dissolved in 200 ml. of a mixture of acetic acid and water (8:2), allowed to stand for 2 hours at 30°, evaporated, washed with ethyl acetate, filtered and dried. 7 g. of H-Glu(OTB)-(Tri)His-Phe-Arg-Try-Gly-(CTB)Lys - Pro - Val - Gly-(CTB)Lys-(CTB)Lys-(CTB)Lys-(CTB)Lys - Pro - Val-(CTB)Lys-Val-Tyr-Pro-Val-NH$_2$ acetate.

1.65 g. of Tri-Ser-Tyr-Ser-Nle-NHNH$_2$ are dissolved in 6 ml. of dimethylformamide with an addition of 2 ml. of water and cooled to −10°. 1 ml. of a 6 N hydrochloric acid and 140 mg. of sodium nitrite are then introduced; the mixture is stirred for 5 minutes at −5°, followed by the further introduction of 300 ml. of an 0.2 N solution of potassium bicarbonate and separation in a centrifuge. The Tri-Ser-Tyr-Ser-Nle-N$_3$ thus obtained is dissolved in 50 ml. of dimethylformamide and 5.02 g. of H-Glu(OTB)-(Tri)His-Phe-Arg-Try-Gly-(CTB)Lys-
  Pro-Val-Gly-(CTB)Lys-(CTB)Lys-(CTB)Lys-
    (CTB)Lys-Pro-Val-(CTB)Lys-Val-Tyr-Pro-Val-NH$_2$ acetate are added. This is allowed to stand at 0° for 12 hours at the end of which a further quantity of tetrapeptide prepared from 1.0 g. of Tri-Ser-Tyr-Ser-Nle-NHNH$_2$ is added. The mixture is allowed to stand for another 6 hours before it is evaporated, treated with ethyl acetate, washed with hot acetone and ethyl acetate and dried in a vacuum. The product thus obtained is dissolved in 100 ml. of trifluoroacetic acid and kept under nitrogen at 20° for one hour. The solvent is evaporated, the residue treated with ethyl acetate, filtered and redried. This product is dissolved in 500 ml. of an 0.2 N acetic acid and the solution treated with Amberlite-IRA-410 in the form of the acetate, filtered and lyophilized. After having been dried over sodium hydroxide, 3.5 g. of H-Ser-Tyr-Ser-Nle-Glu-His-Phe-Arg-Try-Gly-
  Lys-Pro-Val-Gly-Lys-Lys-Lys-Lys-
    Pro-Val-Lys-Val-Tyr-Pro-Val-NH$_2$ acetate are obtained which is chromatographically and electrophoretically homogeneous. (Total hydrolysis reveals the following amino acid composition:

$Ser_{1.8}Tyr_{1.9}Nle_{1.0}Glu_{0.9}His_{1.1}Phe_{1.0}$
$Arg_{1.1}Gly_{2.0}Lys_{6.1}Pro_{2.9}Val_{4.0}$

As known, Try is decomposed by total acid hydrolysis.) The product can be used as such or after having been converted into a different salt. It can be stored in the form of a solution or of an adsorbate.

EXAMPLE 6

*The preparation of tert.amyl-thiophenylcarbonate*

296 ml. of tert.amyl alcohol are dissolved in 212 ml. of pyridine and 800 ml. of chloroform and at 20° 410 g. of chlorothioformic acid S-phenyl ester are added dropwise. The solution is washed with dilute hydrochloric acid, sodium bicarbonate and a saturated solution of common salt. The solvent is then evaporated. Fractional distillation produces 390 g. of tert.amyl-thiophenyl carbonate (M.P. 105–107° under 4 to 5 mm. Hg).

EXAMPLE 7

*The preparation of tert.amyl-carbazate*

81 g. of hydrazine hydrate are added dropwise to 170 g. of tert.amyl-thiophenyl carbonate. This causes the temperature to rise to between 70 and 80°. The mixture is then stirred for 6 hours before a solution of 47 g. of sodium hydroxide in 40 ml. of water is added. The mixture thus obtained is continuously extracted with ether for 24 hours. The ethereal phase is separated, dried over sodium sulfate and the solvent driven off. After fractionation 105 g. of tert.-amyl-carbazate (M.P. 84° at 3 mm. Hg) are isolated.

EXAMPLE 8

*The preparation of α-N-carbobenzoxy-ε-N-carbo-tert.
amyloxy-L-lysine(CBO-(CAT)Lys-OH)*

35 g. of tert.amylcarbazate are dissolved in 28 ml. of glacial acetic acid and 40 ml. of water. At −10° a solution of 40 g. of sodium nitrite in 50 ml. of water is added dropwise. Stirring is continued for an hour before 300 ml. of ether are added. The ethereal phase is washed with water and a solution of sodium bicarbonate and, after drying over sodium sulfate, evaporated. The residue consists of 35 g. of tert.-amyloxycarbonyl azide (CAT-azide). Distillation was not performed because of the explosive nature of this compound.

The CAT-azide is dissolved in 200 ml. of dioxane and added to a mixture of 62 g. of α-N-carbobenzoxy-L-lysine, 350 ml. of water and 15 g. of magnesia. The reaction mixture is stirred at 40° for 16 hours, then filtered, and the dioxane driven off at 40°. 400 ml. of water are added before acidification with dilute sulfuric acid. This is followed by extraction with ethyl acetate. After drying over sodium sulfate, the solvent is evaporated in vacuo. 57 g. of CBO-(CAT)Lys-OH are obtained $[\alpha]_D^{22} = -12°$ in dimethylformamide.

For characterizing the product 20 g. of CBO-(CAT) Lys-OH and 9 g. of dicyclohexylamine are dissolved in

11

50 ml. of ether and allowed to stand at 20° for 2 hours. The crystallized product is filtered off and rewashed with ether. 22 g. of the dicyclohexylamine salt of CBO-(CAT)Lys-OH, M.P. 130°, are obtained.

EXAMPLE 9

*The preparation of α-N-carbobenzoxy-ε-N-carbo-tert.amyloxy-L-lysine methyl ester. (CBO-(CAT)Lys-OMe)*

24 g. of α-N-carbobenzoxy-ε-N-carbo-tert.amyloxy-L-lysine are dissolved in 100 ml. of ether and an ethereal solution of diazomethane is added dropwise until the solution retains a yellow color. The solvent is evaporated in vacuo and the residue dried in a high vacuum over phosphorus pentoxide. 23 g. of α-N-carbobenzoxy-ε-N-carbo-tert.amyloxy-L-lysine methyl ester are obtained in the form of a thickly mobile oil that crystallizes in the course of a few days. (M.P. 38–41°).

EXAMPLE 10

*The preparation of α-N-carbobenzoxy-ε-N-carbo-tert.amyloxy-L-lysine-2,4,5-trichlorophenylester. (CBO-(CAT)Lys-OCP)*

24 g. of CBO-(CAT)Lys-OH and 13 g. of 2,4,5-trichlorophenol are dissolved in 100 ml. of ethyl acetate and at 0° 14 g. of dicyclohexylcarbodiimide are added to the solution. This is shaken at 20° for 16 hours, then filtered off the dicyclohexyl urea, the solvent being evaporated and the residue crystallized from an aqueous ethanol. 32 g. of α-N-carbobenzoxy-ε-N-carbo-tert.amyloxy-L-lysine-2,4,5-trichlorophenyl ester are obtained. M.P. 78°;

$$[\alpha]_D^{22} = -12°$$

in dimethylformamide.

EXAMPLE 11

*The preparation of L-valyl-ε-N-carbo-tert.amyloxy-L-lysyl-L-valyl-L-tyrosyl-L-prolyl-L-valinamide (H-val-(CAT)Lys-Val-Tyr-Pro-Val-NH$_2$) (FIG. 1)*

32 g. of H-Val-Tyr-Pro-Val-NH$_2$.HBr and 37 g. of CBO-(CAT)Lys-OCP (Example 10) are dissolved in 150 ml. of dimethylformamide and 8 ml. of triethylamine are added to the solution. This is shaken at 20° for 48 hours, precipitated with 500 ml. of a N acetic acid and the precipitate washed with water and ethyl acetate. 39 g. of CBO-(CAT)Lys-Val-Tyr-Pro-Val-NH$_2$ are obtained. $[\alpha]_D^{21} = -26°$ in dimethylformamide. 38 g. of CBO-(CAT)Lys-Val-Tyr-Pro-Val-NH$_2$ are dissolved in 500 ml. of methanol and hydrogenated for 6 hours under normal pressure in the presence of a palladium catalyst. After filtration and evaporation of the solvent in vacuo 32 g. of H-(CAT)Lys-Val-Tyr-Pro-Val-NH$_2$ are obtained.

$$[\alpha]_D^{22} = -29°$$

in dimethylformamide.

32. g. of H-(CAT)Lys-Val-Tyr-Pro-Val-NH$_2$ and 22 g. of CBO-Val-OCP are dissolved in 100 ml. of dimethylformamide and kept standing at 20° for 48 hours. The dimethylformamide is driven off in vacuo, and the residue is dissolved in a little n-butanol and ethyl acetate. The solution is washed with dilute sulfuric acid and a solution of sodium bicarbonate. It is then dried over sodium sulfate and evaporated in a vacuum. 36 g. of CBO-Val-(CAT)Lys-Val-Tyr-Pro-Val-NH$_2$ are obtained. $[\alpha]_D^{22} = -25°$ in dimethylformamide.

36 g. of CBO-Val-(CAT)Lys-Val-Tyr-Pro-Val-NH$_2$ are dissolved in 500 ml. of methanol and hydrogenated in the presence of a palladium catalyst for 6 hours at normal pressure. After filtration the methanol is evaporated in a vacuum and the oily residue treated with diethyl ether. 26 g. of H-Val-(CAT)Lys-Val-Tyr-Pro-Val-NH$_2$ are obtained. $[\alpha]_D^{22} = -27°$ in dimethylformamide.

EXAMPLE 12

*L-valyl-glycyl-ε-N-carbo-tert.amyloxy - L - lysyl-ε-N-carbo - tert.amyloxy - L - lysyl-ε-N-carbo-tert.amyloxy-L-lysyl-ε-N-carbo-tert.amyloxy - L - lysyl-L-prolyl-L-valyl-ε-N-carbo - tert.amyloxy-L-lysyl - L - valyl-L-tyrosyl-L-prolyl-L-valinade, H-Val-Gly-(CAT)Lys-(CAT) - Lys-(CAT)Lys - (CAT)Lys - Pro-Val-(CAT)Lys-Val-Tyr-Pro-Val-NH$_2$. (FIG. 2)*

186 g. of CBO-(CAT)Lys-OH and 73 ml. of triethylamine are dissolved in 2 litres of ethyl acetate; 50 ml. of chloroformic acid ethyl ester are added dropwise at −5°; 76 g. of H-Pro-OMe are added; the solution is kept standing at 20° for 4 hours, washed with dilute sulfuric acid and ammonia, dried and evaporated. 230 g. of an oily dipeptide result. This is dissolved in 1.3 litres of dioxane, cooled to 0°, shaken for 1 hour at 20°, 1.3 litres of a N solution of sodium hydroxide having been previously added, and after the introduction of 1.3 litres of water the solution is washed with diethyl ether, cooled to 0°, acidified with a 10% phosphoric acid to pH 2, followed by extraction of the separated oil with ethyl acetate, drying, evaporation of the solvent, washing of the residue with petroleum ether and drying. 195 g. of CBO-(CAT)Lys-Pro-OH, $[\alpha]_D^{20} = -45°$ in dimethylformamide, are obtained and dissolved in 3 litres of methanol and 300 ml. of water, the solution being then hydrogenated in the presence of 10 g. of a 10% palladium carbon. After filtration, evaporation and washing of the residue with diethyl ether, 130 g. of H-(CAT)Lys-Pro-OH are obtained. M.P. 104°; $[\alpha]_D^{20} = -55°$ in dimethylformamide. The above dipeptide is dissolved in 400 ml. of dimethylformamide, 195 g. of CBO-(CAT)Lys-OCP are added, the mixture is allowed to stand at 20° for 12 hours, then evaporated, the residue being dissolved in 400 ml. of a N solution of sodium bicarbonate, washed with diethyl ether and the aqueous phase acidified with a 10% solution of citric acid. This is then extracted with ethyl acetate, dried, evaporated and treated with petroleum ether. 124 g. of CBO-(CAT)Lys-Pro-OH (M.P. 120°) are obtained and dissolved in 1.3 litres of methanol and 100 ml. of water. Hydrogenation is performed in the presence of 10 g. of palladium carbon. After filtration, evaporation and crystallization of the residue from a mixture of dioxane and diethyl ether 84 g. of H-(CAT)Lys-(CAT)Lys-Pro-OH are obtained. M.P. 140°; $[\alpha]_D^{20} = -26°$ in dimethylformamide. 150 g. of CBO-(CAT)Lys-OH and 105 g. of H-(CAT)Lys-OMe are dissolved in a mixture of acetonitrile and 100 ml. of dimethylformamide, cooled to −20°, 83 g. of dicyclohexylcarbodiimide are added and the mixture is shaken for 12 hours at −5°. After filtration and evaporation the residue is redissolved in ethyl acetate, washed with a dilute solution of sulfuric acid and ammonia, dried, reevaporated and the residue crystallized from a mixture of diethyl ether and petroleum ether. 168 g. of CBO-(CAT)Lys-(CAT)Lys-OMe are obtained. M.P. 103°; $[\alpha]_D^{20} = -12°$ in methanol. The above obtained dipeptide ester is dissolved in 1 litre of methanol, hydrogenated in 15 g. of palladium catalyst and evaporated after having been filtered. The residue is dissolved in 400 ml. of dimethylformamide, 125 g. of CBO-Val-Gly-OCP are added, the mixture is kept standing at 20° for 12 hours, then evaporated, treated with ethyl ether, crystallized from aqueous methanol (1:1) and dried. 180 g. of CBO-Val-Gly-(CAT)Lys-(CAT)Lys-OMe. M.P. 175°; $[\alpha]_D^{20} = -18°$ in methanol. The resultant tetrapeptide ester is dissolved in 200 ml. of methanol and after addition of 80 ml. of hydrazine hydrate allowed to stand for 16 hours at 20°. 1 litre of water is added, followed by filtration, washing with water, drying over sulfuric acid, and redissolution in methanol. The solution is poured into ether, followed by filtration and drying. 147 g. of CBO-Val - Gly-(CAT)Lys-(CAT)Lys-NHNH$_2$ are obtained. M.P. 200°; $[\alpha]_D^{20} = -10°$ in dimethylformamide.

25.0 g. of CBO - Val - Gly-(CAT)Lys-(CAT)Lys-NHNH$_2$ are dissolved in a mixture, previously cooled to −10°, of 200 ml. of dimethylformamide, 50 ml. of isopropanol and 30 ml. of a 4 N hydrochloric acid. With vigorous stirring 7 ml. of an aqueous 5 N solution of sodium nitrite are added dropwise, stirring being continued for another 5 minutes at —5°, and after first introducing 18 ml. of triethylamine and then 500 ml. of ice water, the mixture is sharply filtered on a suction filter, the precipitate being dissolved in 100 ml. of dimethylformamide, 15.0 g. of H-(CAT)Lys-(CAT)Lys-Pro-OH and 3.5 ml. of triethylamine added, the solution concentrated in a high vacuum to 90 ml. and then kept standing for 16 hours at 0°. 800 ml. of ethyl acetate are then added, followed by washing with dilute acetic acid and evaporation of the ethyl acetate, the residue being poured into 1 litre of water, filtered and dried over sodium hydroxide. 25 g. of CBO-Val-Gly-(CAT)Lys-(CAT)Lys-(CAT)Lys-(CAT)Lys-Pro-OH being obtained. M.P. 150° (decomp): $[\alpha]_D^{20}=-6°$ in dimethylformamide. The heptapeptide thus obtained is dissolved in 80 ml. of absolute pyridine, evaporated, the residue redissolved in 80 ml. of absolute pyridine, 10 g. of tri-(2,4,5-trichlorophenyl)phosphite are added, the mixture is stirred for 16 hours at 20°, the solvent evaporated and the residue dissolved in ethyl acetate, washed with dilute sulfuric acid and then with a N solution of sodium bicarbonate, dried over sodium sulfate, evaporated and the residue crystallized from a mixture of ethyl acetate and petroleum ether. 26 g. of CBO-Val-Gly-(CAT)Lys - (CAT)Lys-(CAT)Lys-(CAT)Lys-Pro-OCP are obtained and at once dissolved in 75 ml. of dimethylformamide. 20 g. of H-Val-(CAT)Lys-Val-Tyr-Pro-Val-NH₂ are added and, after this has been kept standing at 20° for 2 days, the solution is precipitated with diethyl ether, filtered and the residue dried. The resultant product is dissolved in an 8:2 mixture of methanol and water, treated with an acid ion exchanger, evaporated and the residue crystallized from an 8:1 mixture of ethanol and water. 15.0 g. of CBO-Val-Gly-(CAT)Lys-(CAT)Lys-(CAT)Lys - (CAT)Lys-Pro-Val-(CAT)Lys-Val-Tyr-Pro-Val-NH₂ are obtained. M.P. 190° (decomp.);

$$[\alpha]_D^{20}=-6°$$

in dimethylformamide. This tridecapeptide is dissolved in 500 ml. of methanol, hydrogenated in the presence of 5 g. of palladium carbon, filtered, evaporated and the residue treated with diethyl ether. The yield is 12 g. of H-Val-Gly - (CAT)Lys-(CAT)Lys-(CAT)Lys-(CAT)Lys-Pro Val-(CAT)Lys-Val-Tyr-Pro-Val-NH₂. M.P. 198°.

EXAMPLE 13

*Trityl - O - tert.butyl - L - glutamyl-imtrityl-L-histidyl-L-phenylalanyl-L-arginyl-L-tryptophanyl - glycyl - N - ε-carbo-tert.amyloxy-L-lysyl-L-proline - 2,4,5 - trichlorophenyl ester (Tri - Glu(OTB)-(Tri)His-Phe-Arg-Try-Gly-(CAT)Lys-Pro-OCP) (FIG. 3)*

100 g. of CBO-(NO₂)Arg-Try-Gly-OMe are dissolved in 1.5 litres of an 8:2 mixture of dioxane and water, 250 ml. of a N solution of sodium hydroxide are added, the solution is kept standing for 1 hour at 20°, then poured into 5 litres of an 0.05 N sulfuric acid, the precipitate being filtered off with suction, washed with water, alcohol, diethyl ether and petroleum ether and dried. 95 g. of CBO-(NO₂)Arg-Try-Gly-OH (M.P. 225°; $[\alpha]_D^{20}=-14°$ in dimethylformamide) are obtained and dissolved in 1.1 litres of absolute pyridine. 85 g. of tri(2,4,5-trichlorophenyl)-phosphite are added followed by 16 hours stirring at 20° at the end of which the solvent is evaporated, the residue dissolved in ethyl acetate, washed with dilute sulfuric acid, dried and reevaporated. After crystallization of the residue from a mixture of ethyl acetate and diethyl ether 125 g. of CBO-(NO₂)Arg-Try-Gly-OCP, M.P. 124°; $[\alpha]_D^{20}=-9°$ in dimethylformamide, are obtained. The tripeptide ester thus obtained is dissolved in 240 ml. of dimethylformamide, 750 g. of H-(CAT)Lys-Pro-OH (Example 12) are added and after stirring for 16 hours at 20° the solution is precipitated with diethyl ether, filtered and the residue dissolved in a mixture of ethyl acetate and water, washed with a N citric acid, dried and evaporated. The residue is crystallized from ethyl acetate twice. 125 g. of CBO-(NO₂)Arg-Try-Gly-(CAT)Lys-Pro-OH, M.P. 140°; $[\alpha]_D^{20}=-20°$ in dimethylformamide, are obtained. 85 g. of CBO-(NO₂)Arg-Try-Gly-(CAT)Lys-Pro-OH are dissolved in 450 ml. of glacial acetic acid, 50 ml. of water and 50 g. of a 10% palladium carbon added and after hydrogenation, filtration, evaporation, solution in water, lyophilization and drying over sodium hydroxide 46 g. of H-Arg-Try-Gly-(CTB)Lys-Pro-OH are obtained. $[\alpha]_D^{20}=-9°$ in a 95:5 mixture of acetic acid and water. 61.5 g. of Tri-Glu(OTB)-(Tri)His-Phe-NHNH₂ (Example 4) are dissolved in 150 ml. of dimethylformamide and 150 ml. of isopropanol, cooled to —10° and, after addition of 60 ml. of a 4 N hydrochloric acid, 13.5 g. of a 5 N solution of sodium nitrite are added with stirring. After waiting for 5 minutes 42 ml. of triethylamine and 1500 ml. of ice water are added, the mixture is filtered with suction, the precipitate dissolved in ethyl acetate, washed with a saturated solution of common salt, dried, evaporated at 0°, the residue dissolved in 150 ml. of dimethylformamide, 40.0 g. of H-Arg-Try-Gly-(CAT)Lys-Pro-OH.3 AcOH and 6.0 ml. of triethylamine are added, the mixture kept standing at 0° for 16 hours, 1500 ml. of ethyl acetate are added and, after washing with an 0.5 N acetic acid, water and an 0.5 N pyridine, evaporation, dissolution of the residue in 150 ml. of ethyl acetate and precipitation with diethyl ether, 70 g. of Tri-Glu(OTB)-(Tri)His-Phe-Arg-Try-Gly-(CAT)Lys - Pro - OH are obtained. M.P. 150°; $[\alpha]_D^{20}=-15°$ in dimethylformamide. The peptide thus obtained is dissolved in 300 ml. of pyridine, cooled to —20°, 45 ml. of a N solution of hydrochloric acid in dioxane are added, the mixture is stirred for 5 minutes at —20°, 12 ml. of triethylamine are added, the whole concentrated to half its volume, 45 g. of tri(trichlorophenyl)-phosphite added, and after this mixture has been kept standing at 20° for 16 hours at the end of which it is evaporated, the residue is treated with diethyl ether, dissolved in ethyl acetate, precipitated with diethyl ether, filtered and dried. 78 g. of Tri-Glu(OTB)-(Tri)His-Phe-Arg-Try-Gly-(CAT)Lys-Pro - OCP. HCl are obtained. M.P. 170° (decomp.); $[\alpha]_D^{20}=-20°$ in dimethylformamide.

EXAMPLE 14

Figure 4:
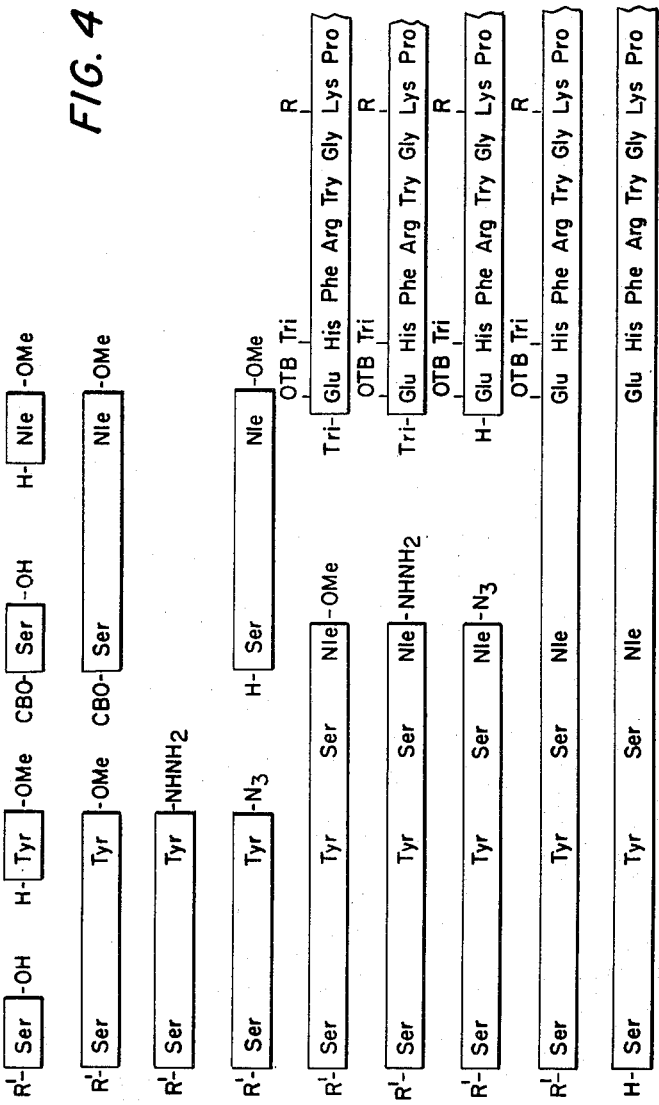

*L - seryl - L - tyrosyl - L - seryl - L - norleucyl - L - glutamyl - L - histidyl - L - phenylalanyl - L - arginyl - L-tryptophanyl - glycyl - L - lysyl - L - prolyl - L - valyl-glycyl - L - lysyl - L - lysyl - L - lysyl - L - lysyl - L-prolyl - L - valyl - L - lysyl - L - valyl - L - tyrosyl - L-proplyl - L - valinamide (H - Ser - Tyr - Ser - Nle - Glu-His - Phe - Arg - Try - Gly - Lys - Pro - Val - Gly - Lys-Lys - Lys - Lys - Pro - Val - Lys - Val - Tyr - Pro - Val-NH₂) (FIG. 4)*

18.5 g. of Tri-Glu(OTB)-(Tri)His-Phe-Arg-Try-Gly-(CAT)Lys-Pro-OCP.HCl and 18.0 g. of H-Val-Gly-(CAT)Lys - (CAT)Lys - (CAT)Lys - (CAT)Lys - Pro-Val-(CAT)Lys-Val-Tyr-Pro-Val-NH₂ (Example 12) are dissolved in 60 cc. of dimethylformamide, 9.0 g. of imidazole are added and the solution is allowed to stand at 20° for 3 days. Another 1.8 g. of the same octapeptide hydrochloride are added and after this has been kept standing for another 16 hours at 20° the solution is precipitated with ethyl acetate, filtered, the residue dissolved in ethanol, precipitated with ethyl acetate, filtered again and dried. 26.0 g. of Tri-Glu(OTB)-(Tri-)His-Phe-Arg-Try-Gly - (CAT)Lys - Pro - Val - Gly - (CAT)Lys - (CAT) Lys - (CAT)Lys - (CAT)Lys - Pro - Val - (CAT)Lys-Val - Tyr - Pro - Val - NH₂ (M.P. 190° (decomp.); $[\alpha]_D^{20}=-27°$ in dimethylformamide) are obtained and dissolved in 200 ml. of an 8:2 mixture of acetic acid and water. The solution is allowed to stand at 30° for 2 hours, evaporated, the residue washed with ethyl acetate, filtered and dried. 22 g. of H-Glu(OTB)-(Tri)His-Phe-Arg-Try-Gly - (CAT)Lys - Pro - Val - Gly - (CAT)Lys - (CAT) Lys - (CAT)Lys - (CAT)Lys - Pro - Val - (CAT)Lys-Val-Tyr-Pro-Val-NH₂ acetate are obtained.

2.3 g. of Tri-Ser-Tyr-Ser-Nle-NHNH$_2$ (Example 5) are dissolved in 12 ml. of dimethylformamide, 4 ml. of water are added, the solution is cooled to $-10°$, 2 ml. of a 6 N hydrochloric acid are added, followed by the introduction of 280 mg. of sodium nitrite. After stirring for 5 minutes at $-5°$ 300 ml. of an 0.2 N solution of potassium bicarbonate are added and the whole is centrifuged. The Tri-Ser-Tyr-N$_3$ thus obtained is dissolved in 50 ml. of dimethylformamide, 10.5 g. of H-Glu-(OTB)-(Tri)His Phe - Arg - Try - Gly - (CAT)Lys - Pro - Val- Gly - (CAT) - Lys - Val - Gly - (CAT)Lys - (CAT)Lys-(CAT)Lys - (CAT)Lys - Pro - Val - (CAT)Lys - Val-Tyr-Pro-Val-NH$_2$ acetate are added and after this has been kept standing at 0° for 12 hours an additional quantity of tetrapeptide azide prepared from 2.0 g. of Tri-Ser-Tyr-Ser-Nle-NHNH$_2$ is introduced. After again having allowed the solution to stand for another 6 hours at 0° the solvent is evaporated, the residue treated with ethyl acetate, washed with hot acetone and ethyl ester and dried in vacuo. The resultant product is dissolved in 100 ml. of a 90% trifluoroacetic acid and kept for 1 hour at 20° under nitrogen, at the end of which the solution is evaporated, the residue treated with ethyl acetate, filtered and dried. The product is redissolved in 500 ml. of an 0.2 N acetic acid, the solution is treated with Amberlite-IRA-410 in the form of the acetate, filtered and lyophilized. After the product has been dried over sodium hydroxide 7.5 g. of H-Ser-Tyr-Ser-Nle-Glu-His - Phe - Arg - Try - Gly - Lys - Pro - Val - Gly-Lys-Lys-Lys-Lys-Pro-Val-Lys-Val-Tyr-Pro-Val-NH$_2$ acetate are obtained, which behave homogeneously when submitted to chromatography and electrophoresis. (Total hydrolysis gives the following composition of amino acids: Ser$_{1.8}$ Tyr$_{1.9}$ Nle$_{1.0}$ Glu$_{0.9}$ His$_{1.1}$ Phe$_{1.0}$ Arg$_{1.1}$ Gly$_{2.0}$ Lys$_{6.1}$ Pro$_{2.9}$ Val$_{4.0}$).

As known Try is decomposed by total acid hydrolysis, The product can be used as such or after having been converted into some other salt. It will keep in the form of a solid, in solution or as an adsorbate.

What is claimed is:

A compound selected from the group consisting of L - seryl - L - (tyrosyl - L - seryl - L - norleucyl - L-glutamyl - L - histidyl - L - phenylalanyl - L - arginyl - L-tryptophanyl - glycyl - L - lysyl - L - prolyl - L - valyl-glycyl - L - lysyl - L - lysyl - L - lysyl - L - lysyl - L-prolyl - L - valyl -L - lysyl - L - valyl - L - tyrosyl - L-prolyl-L-valinamide and its physiologically acceptable acid addition salts.

References Cited

Schroder et al.; The Peptides, vol. II, New York, Academic Press, 1966, pp. 246–249.

LEWIS GOTTS, *Primary Examiner.*

M. M. KASSENOFF, *Assistant Examiner.*